United States Patent Office 3,819,660
Patented June 25, 1974

---

3,819,660
ALKENYLSUCCINIC ANHYDRIDE PREPARATION
Paul J. Cahill, Lombard, and Adam S. Kurasiewicz, Wheaton, Ill., assignors to Standard Oil Company, Chicago, Ill.
No Drawing. Filed Dec. 22, 1972, Ser. No. 317,673
Int. Cl. C07c 55/10
U.S. Cl. 260—346.8 R           9 Claims

ABSTRACT OF THE DISCLOSURE

Suppression of fumaric acid sublimation and tar formation during reaction of 168 to 900 M.W. alkene with maleic anhydride and increased yield of alkenylsuccinic anhydride are achieved by the use of catalytic amount of p-alkylbenzenesulfonic acid, especially p-toluenesulfonic acid and 1-3 weight parts of acetic anhydride per weight part of the sulfonic acid during said reaction.

BACKGROUND OF INVENTION

Initial interest in alkenylsuccinic anhydride and its dicarboxylic acid as anti-rust and anti-corrosion agents arose in the early 1940's as indicated, for example, by the teachings in U.S. Pat. Nos. 2,055,458; 2,124,628 and 2,133,734 among others. Those patents disclose the preparation of alkenylsuccinic anhydride by the reaction of an alkene hydrocarbon, generally of a carbon content not exceeding 20–24 carbon atoms, for example, fractions such as cracked wax hydrocarbon or from similar size propene or butene polymers. In general, such alkenylsuccinic anhydride and alkenyl-substituents of 2 to about 24 carbon atom content. Later, interest was developed in alkenylsuccinic anhydrides whose alkenyl-substituents contained 30 or more and up to 200 carbon atoms obtained by reacting maleic anhydride with the appropriate molecular weight size liquid viscous to semi-solid polypropenes or polybutene obtained by polymerization of propene or a butene in the presence of Friedel-Crafts type catalyst, especially aluminum chloride catalyst. Such polymerizations provided as a practical matter polypropane products of a number average molecular weight up to about 1200 and polybutene products of a number average molecular weight up to about 2800. Said polybutenes were prepared by polymerization of isobutene alone or in admixture with butene-1 and butene-2 or mixtures thereof also containing butane and a small amount of 1,3-butadiene. Such mixtures of $C_4$ hydrocarbons and $C_4$ fractions or B–B stream have isobutene as the major $C_4$ hydrocarbon and are obtainable from processing of petroleum fractions. Both the polypropene and polybutene products so obtained have more than one but less than two carbon-to-carbon double bonds. However, not all of molecules of such polypropene and polybutenes have reactive olefinic groups and those molecules do not enter into the reaction with maleic anhydride. Such unreactive molecules can comprise from 10–30 weight percent of such polymers.

The polybutenes proposed as above described are still further unique in that the olefinic group can be di-, tri- and tetra-substituted as in the following polymer formulae:

Disubstituted:

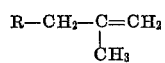

Trisubstituted:

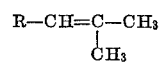

Tetrasubstituted:

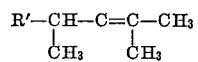

wherein R and R' are the branched hydrocarbon chain wherein the backbone chain and the branches contain repeating butyl groups, mainly isobutyl groups with only an occasional hindered butylene group (less than one per molecule) which accounts for the unreacting site. The unreactive species is believed to contain its unsaturation as a hindered unsaturation.

Alkenes other than such polypropenes and polybutenes, for example from cracked paraffinic wax hydrocarbons and the $\alpha$-olefins are substantially all reactive. That is they contain no unreactive isomeric species. Also such other alkenes are either a single molecular entity or a mixture of molecular entities differing by not more than two carbons (i.e., by not more than 28 in their molecular weights).

The preparation of alkenylsuccinic anhydrides, in general, has been a non-catalytic addition of the aforementioned polypropene or polybutene to one of the unsaturated ring carbons of maleic anhydride and the addition of the allylic hydrogen to the other unsaturated ring carbons at a temperature above the melting point (58.2° C.) of maleic anhydride up to about 500° F. The addition reaction is generally conducted with a small molar excess of the alkene, e.g. 1.1 to 1.2 moles alkene, per mole maleic anhydride in an attempt to maximize utilization of maleic anhydride. Unfortunately some of the maleic anhydride undergoes thermal decomposition but such decomposition can be minimized by the slow addition of molten maleic anhydride to the alkene heated to reaction temperature. When the alkene is of low molecular weight below about 300 M.W. little tarry by-product forms during the non-catalytic reaction with maleic anhydride. But as the alkene molecular weight increases there is formed a discoloring by-product in the form of a tarry to coke-like material which foul reactors, transfer lines therefrom and heat exchangers through which the reaction effluent flows. The tarry material may in some part originate from decomposition of maleic anhydride but, it is believed, that the tarry material originates in the most part from the alkene. The formation of coke-like tar is most pronounced when the alkene is polybutene.

Again polybutene is somewhat unique with respect to said coke-like tar as is evidenced by the evaluation of the reaction and retroreaction and retroisomerization of the isomeric therminal butenyl groups of the polybutenes. The polybutenes, as before stated, have olefinic groups which are in the di-, tri- and tetra-substituted isomeric configurations. With respect to reactivity of such isomeric configurations the trisubstituted configuration is most reactive, the di-substituted is next in the reactivity and the tetra-substituted is the least reactive. However, the thermal stability of the resulting polybutenyl-substituted succinic anhydrides are in the reverse order but the retroreactivities (i.e., reverse reaction back to maleic anhydride and polybutene) in each case, although slower than the reaction to form the substituted succinic anhydride, are in the same order as the reactivities.

To avoid formation of the tarry to coke-like tarry materials, kinetic control with respect to enhancing formation of trisubstituted reacting olefinic groups in the reactant olefin and thermodynamic control with respect to formation of tetra-substituted olefinic group attachment to the succinic anhydride ring is needed. Catalysis or chemical modification, e.g. slight chlorination, of the polybutene reactant appear to be required to achieve such controls.

During reaction of alkenes with maleic anhydride, fumaric acid forms and sublimes. Such fumaric acid sublimation causes solids deposition in vapor transfer conduits and overhead condensers to such an extent that said transfer conduit and/or condenser passages become plugged. Fumaric acid, the rotational isomer of maleic acid, readily forms upon hydrolysis of maleic anhydride in the presence of acidic materials. Thermal decomposition of maleic anhydride is a source of water for such hydrolysis of maleic anhydride. It is also desirable to suppress sublimation of fumaric acid during reaction of the alkene with maleic anhydride.

SUMMARY OF THE INVENTION

It has been discovered that the reaction of alkene hydrocarbon with maleic anhydride in general can be accelerated and formation of tarry coke-like material when the reaction involves alkene hydrocarbon of 168–900 M.W. can be suppressed by the use of alkylbenzenesulfonic acid as catalyst. Such catalyst should be soluble either in the alkene hydrocarbon or molten maleic anhydride. But such use of the sulfonic acid catalyst appears to enhance fumaric acid sublimation in some unknown manner. It has also been discovered that the additional use of acetic anhydride suppresses fumaric acid sublimation.

During the addition reaction acetic anhydride provides a good solvent for the alkylbenzenesulfonic acid catalyst. For both of those purposes acetic anhydride is used in amounts of 1–4 weight parts per weight part of alkylbenzenesulfonic acid which in turn is used in catalytic amounts from 0.01 to 0.5 weight percent of the alkene. In the practice of this invention the acetic anhyride solution of catalyst can be added to the alkene as a feed stream separate from maleic anhydride which is added as a melt. But it is preferred to add both acetic anhydride and catalyst dissolved in the molten maleic anhydride.

A further advantage from the use of the alkylbenzenesulfonic acid, especially p-toluenesulfonic acid, is the kinetic control of maximizing isomerization of the olefinic group of polybutenes to the more reactive trisubstituted form which leads to polybutenyl succinic anhydride of the tetrasubstituted olefinic configuration by isomerization of the disubstituted adduct produced.

In the non-catalytic addition reaction between polybutene and maleic anhydride which is reversible, the order of polybutene reactivity with maleic anhydride with respect to the three isomeric forms of the terminal butenyl group is, in decending order, trisubstituted disubstituted tetrasubstituted. The retroactivity, although in each case less than reactivity, follows the order of reactivity. The non-catalytic reactions produce adducts which have mainly di- and tri-substituted butenyl groups. During retroreaction, isomerization of the olefinic group does take place. Since the adduct from the disubstituted butenyl group is more stable than the adduct from the trisubstituted butenyl group, there is an accumulation of such adduct from the di-substituted butenyl group beyond the theoretical amount represented by the occurrence of the disubstituted butenyl group in the starting polymer. The distribution of the non-catalytically formed adducts resulting from the three isomeric forms is typically:

| From: | Percent adduct |
|---|---|
| Disubstituted | 51.6 |
| Trisubstituted | 35.0 |
| Tetrasubstituted | 13.4 |

The above three adducts can exist in six forms: two from the disubstituted, one from the trisubstituted and three from the tetrasubstituted, are illustrated below wherein —SA is used to indicate the succinic anhydride ring:

From disubstituted olefin:

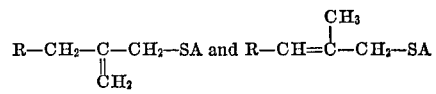

From trisubstituted olefin:

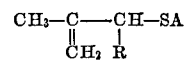

From tetrasubstituted olefin:

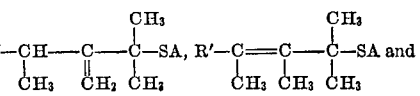

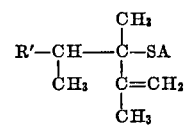

The alkylbenzenesulfonic acid catalyst isomerizes the adducts of tri-substituted butenyl group to the thermodynamically most stable adduct of the tetra-substituted olefinic configuration (i.e. thermodynamic product control) and at the same time effects kinetic control by isomerization of the disubstituted butenyl group to the more reactive trisubstituted butenyl group.

The total effects (kinetic control plus thermodynamic control) of the alkylbenzenesulfonic acid catalyst results in a distribution of the adducts which is typically:

| From: | Percent adduct |
|---|---|
| Disubstituted | 9.25 |
| Trisubstituted | 26.75 |
| Tetrasubstituted | 64.00 |

The foregoing demonstrated substantial increase in tetrasubstituted adduct species effected by the alkylbenzenesulfonic acid catalyzed isomerization of butene polymer but also adversely causes darkening of the resulting reaction than in the absence of such reaction. Heating a mixture of the butene polymer and the alkylbenzenesulfonic acid catalyst causes some isomerization of the polymer but also adversely causes darkening of the resulting polymer. For example, samples of a 320 $\overline{M}_n$ butene polymer are heated with from 0.01 to 0.2 weight percent p-toluenesulfonic acid (p-TSA) and 0.05 weight percent sulfonic acid of 320 $\overline{M}_n$ butene polymer (BSA). Polymer isomerization attempts had to be stopped at a maximum temperature of 150° C. because of undesired darkening of the polymer at such temperature. Each treated sample and one untreated sample of the butene polymer were subjected to NMR analysis to determine the respective contents (mole percent) of tri- and di-substituted olefins. The following data illustrates the lesser isomerization effected in the absence of the addition reaction.

320 $\overline{M}_n$ Butene Polymer Isomerization at 150° C.

| | Mole percent | |
|---|---|---|
| Catalyst | Trisubstituted olefin | Disubstituted olefin |
| None | 57.1 | 8.58 |
| 0.2% p-TSA | 55.4 | 7.85 |
| 0.1% p-TSA | 63.4 | 8.05 |
| 0.02% p-TSA | 60.9 | 7.80 |
| 0.05% BSA | 58.9 | 7.83 |

The use of 0.1 and 0.02% p-TSA did result in 11.1 and 6.65 percent increase in trisubstituted olefin species content but such increases were not consistently accompanied by equivalent decreases in contents of disubstituted and tetrasubstituted (by difference) olefin species. At the 0.2% p-TSA use both tri- and di-substituted olefin species content decreased but at non-equivalent amounts. The 0.05% BSA use increased trisubstituted olefin species content 3.85 percent but at the non-equivalent 8.75 decrease in disubstituted olefin species. Thus the sulfonic acid catalysis holds little promise as a method for effecting the desired isomerization of the neat butene polymer.

Because of said kinetic and thermodynamic controls resulting from use of the alkylbenzenesulfonic acid, retro-reactivity is decreased during adduct formation which, as will be hereafter demonstrated, increases adduct product yield, an advantage in addition to the sought suppression of tarry-coke formation and fumaric acid sublimation.

A further benefit stemming from the substantially different isomeric adduct distribution is that the succinimide from such polybutyl-butenylsuccinic anhydride adducts from polyethylene polyamines; $H_2N-(C_2H_4-NH)_xH$ wherein $x$ is a number of from 1–10, especially the succinimide from diethylene triamine are improved as an addition agent for gasoline. Such improvement for the high tetrasubstituted adduct content polybutyl-butenyl succinimide is with respect to its lower water emulsification property.

However, the use of alkylbenzenesulfonic acid catalyst can result in the formation of fumaric acid. Maleic anhydride would not hydrolyze to maleic acid when all reactants and catalyst are free of water. While molten maleic anhydride used as reactant is free of water and the alkene reactant contains less than 0.001 mole percent water, maleic anhydride decomposition at reaction conditions does provide water for such hydrolysis. The alkylbenzenesulfonic acid catalyst can be prepared water-free but is usually obtained with from 2.7% water as in the commercially available mixture of p-toluenesulfonic (80%) and o-toluenesulfonic (20%) acids up to the water content of the sulfonic acid monohydrate which is 10.4% water for p-toluenesulfonic acid monohydrate. However the total amount of fumaric acid formed substantially exceeds the stoichiometric amount resulting from the water introduced by the sulfonic acid catalyst. Such greater amount of fumaric acid production appears to even exceed the stoichiometric amount related to water from the decomposition of maleic anhydride. This indicates that the sulfonic acid catalyst must also decompose since it is the only other source of hydrogen and oxygen for water formation.

While fumaric acid sublimation during alkenylsuccinic anhydride preparation would be a problem because sublimed fumaric acid would solidify and plug overhead vapor transfer lines and condenser, the use of acetic anhydride in amounts of 1–4 weight parts per weight part of alkylbenzenesulfonic acid catalyst substantially suppresses sublimation, and to a lesser extent the formation of, fumaric acid. Such amount of acetic anhydride is also sufficient to dissolve the sulfonic acid catalyst and provides a convenient way to charge the catalyst to the addition reaction.

During the addition reaction between the alkene and maleic anhydride in the respective molar ratio of 1.1:1.0 at 215° C., the non-catalytic process produces about 0.4 weight percent fumaric acid based on the reaction mixture and produces 0.2–0.3 weight percent fumaric acid on the same basis when using alkylbenzenesulfonic acid catalyst and acetic anhydride. Thus the production of fumaric acid is suppressed 50–25% by the use of the sulfonic acid catalyst and acetic anhydride. In the absence of acetic anhydride 50 percent or more of the fumaric acid formed sublimes during reaction but with the use of acetic anhydride only 20–22 of the fumaric acid formed sublimes during reaction.

SPECIFIC EMBODIMENT

For the preparation of alkenylsuccinic anhydride from 168–900 $\overline{M}_n$ alkene and maleic anhydride used in the respective reactant molar ratio of 1.1–1.2:1.0 it is preferred to use as catalyst for reaction temperatures within the range of 175 to 235° C. a lower alkyl-substituted, e.g. $C_1$–$C_3$ alkyl, benzenesulfonic acid and especially such sulfonic acid containing 70–100 weight percent of the p-alkyl-benzenesulfonic acid isomer. When said catalyst contains less than 100% of the para-isomer, the remaining alkyl-sulfonic acid is substantially the ortho-isomer. Most preferred of such $C_1$–$C_3$ alkylbenzene sulfonic acids is p-toluenesulfuric acid containing 0–30 weight percent o-toluenesulfonic acid isomer. The o-acid isomer does not appear to have any catalytic effect for the addition of alkene to maleic anhydride. The preference for p-toluene sulfonic acid over the other p-$C_1$–$C_3$-alkyl-substituted sulfonic acids is based on its commercial availability. The choice of $C_1$–$C_3$-alkyl-substituted benzenesulfonic acids over benzenesulfonic acid and higher carbon content alkyl-substituted benzenesulfonic acids is based on solubility in acetic anhydride and/or in the reaction system. Since the use of the sulfonic acid catalyst is 0.01 to 0.5 weight percent of the alkene and the use of acetic anhydride is 1–4 times said sulfonic acid catalyst, the acetic anhydride used amounts to only 0.01 to 2.0 percent based on the alkene.

To demonstrate the reaction rate effect on the addition of alkene to maleic anhydride by the lower alkyl-substituted benzenesulfonic acid catalyst the following reactions are performed wherein the control reactions are without catalyst and the Illustrative Examples are with 0.1 weight percent p-toluenesulfonic acid CP-TSA monohydrate based on the alkene. In each reaction there is used 1.1 mole alkene (polybutene of 320 $\overline{M}_n$) and 1.0 mole of maleic anhydride. Molten maleic anhydride is slowly added over 6.5 hours to stirred alkene heated to a temperature of 210–218° C. and the reaction mixture is stirred and held at 215 to 217° C. from 0 to 7.5 hours (Reaction Time) after maleic anhydride is added. The amount of alkenylsuccinic anhydride and maleic acid present at the end of each reaction is determined. The results of these preparations are shown in Table I.

TABLE I

| Example | Reaction type | 0 hrs. | 1.5 hrs. | 3.5 hrs. | 5.5 hrs. | 7.5 hrs. |
|---|---|---|---|---|---|---|
| 1–5 | Control—Coke | Severe | Severe | Severe | Severe | Severe. |
|  | Percent maleic anhydride | 12.3 | 10.2 | 9.04 | 7.15 | 6.28. |
|  | Percent alkenylsuccinic anhydride | 52.0 | 52.2 | 51.6 | 55.3 | 60.1. |
| 1–5 | Illustrative—0.1% p-TSA:coke | Trace | Trace | Trace | Trace | Trace. |
|  | Percent maleic anhydride | 10.8 | 7.53 | 6.21 | 4.65 | 2.99. |
|  | Percent alkenylsuccinic anhydride | 46.0 | 56.1 | 65.1 | 68.9 | 72.5. |

The addition reaction between various alkenes (polybutenes of 250, 320, 900 and 1100 $\overline{M}_n$) and maleic anhydride are conducted as described above without catalyst (Control Reactions) and with p-TSA monohydrate as catalyst (Illustrative Reactions) and the appearance of tarry-coke is rated on a scale of 1 to 4 wherein 1 is a trace and 4 is severe. The Reaction Time is as above, that is hours after maleic acid addition. The results of these preparations are shown in Table II.

TABLE II

| Example | Reaction type | Alkene, $\overline{M}_n$ | Time, hours | Percent catalyst | Percent alkenyl-succinic anhydride | Coke |
|---|---|---|---|---|---|---|
| 6 | Illustrative | 250 | 7.5 | 0.1 | 69.7 | 1 |
| 6 | Control | 250 | 8.0 | 0 | 61.6 | 4 |
| 7 | Illustrative | 320 | 7.5 | 0.1 | 65.3 | 1 |
| 7 | Control | 320 | 7.5 | 0 | 58.0 | 4 |
| 8 | Illustrative | 900 | 5.5 | 0.035 | 55.9 | 2 |
| 9 | do | 900 | 5.0 | 0.10 | 57.2 | 1 |
| 8 | Control | 900 | 5.5 | 0 | 52.8 | 4 |
| 10 | Illustrative | 1,100 | 5.5 | 0.035 | 52.1 | 3 |
| 11 | do | 1,100 | 5.0 | 0.10 | 53.6 | 3 |
| 10 | Control | 1,100 | 5.5 | 0 | 47.6 | 4 |

Little coke suppressing effect is achieved with the use of p-TSA and 1100 $\overline{M}_n$ alkene although reaction rate at 5.5 hours reaction was increased about 9.5%. For the alkenes of $\overline{M}_n$ below 1100 (250, 320 and 900) tar suppression by p-TSA was very significant and reaction rate was improved by 8.4–13.2%.

All of the foregoing reactions were conducted in the absence of acetic anhydride. In the following illustrative examples a p-toluenesulfonic acid is used in amounts of from 0.7–1.05 grams per 700 grams of 320 $\overline{M}_n$ alkene (polybutene) which was used with 193 grams maleic anhydride at a reaction temperature of 215° C. Again the reaction time is about 7.5 hours after molten maleic acid is added to stirred alkene heated to reaction temperature. During these reactions the amount of fumaric acid sublimed is also measured and the amount of water necessary to form such sublimed fumaric acid is given (water-theory) as is the amount of water actually added by hydration. The results of these preparations are shown in Table III.

during reaction amounted to 0.42 gram. The resulting stirred reaction mixture at a temperature of 215° C. is heated, nitrogen gas is injected into the hot, stirred mixture for two hours over a temperature from 220 to 227° C., the mixture of gases and vapors are transferred to a condenser operated at 210–215° C. A solid product in an amount of 1.5 grams is collected. Said solid was found to have a melting point above 200° C. indicating the presence of substantial fumaric acid and, by infrared analysis, was found to contain maleic acid. The total fumaric acid formed was about 1.7 grams.

One important use for the lower molecular weight alkenylsuccinic anhydride products, those whose alkenyl-substituent have molecular weights in the range of 250–600, is through their alkenylsuccinimides of ethylene diamine, diethylene triamine and triethylene tetramine as detergent addition agents for gasoline. Gasoline containing such alkenylsuccinimides prevents deposits from forming in the carburetors, cleans a carburetor exposed to untreated gasoline and prevents rust formation in the

TABLE III

Reaction of maleic anhydride (193 grams), 320 M.W. alkene (700 grams) at 420° F. for 14 hours

| Example number | Catalyst, p-TSA, grams | AC₂O, grams | Sublimed fumaric acid, grams | Water, gram Theory | Water, gram Added | Percent alkenyl-succinic anhydride in reaction product |
|---|---|---|---|---|---|---|
| 12 | ¹ 1.4 | 0 | 3.43 | 0.53 | 0.0378 | 66.8 |
| 13 | ¹ 0.7 | 0 | 1.30 | 0.22 | 0.0189 | 67.5 |
| 14 | ¹ 1.05 | 1.0 | ³ 2.15 | 0.33 | 0.0284 | 66.6 |
| 15 | ¹ 1.05 | 2.0 | 0.42 | 0.07 | 0.0284 | 64.6 |
| 16 | ¹ 1.05 | 3.0 | 0.50 | 0.09 | 0.0284 | 62.1 |
| 17 | ² 0.7 | 0 | 2.74 | 0.43 | 0.0724 | 65.3 |
| 18 | ² 0.7 | 0.46 | ⁴ 2.12 | 0.33 | 0.0724 | 65.8 |

¹ 80–20 p-o-toluenesulfonic acid, 2.7% H₂O.
² Monohydrate of toluenesulfonic acid, 10.4% H₂O.
³ Appeared at tenth hour.
⁴ Appeared 2 hours later than in Example 17.

In the three reactions in which no acetic anhydride (AC₂O) was used (Examples 12, 13 and 17 of Table III) and the added water (water associated with p-toluenesulfonic acid catalyst), the sublimed fumaric acid in each case indicated water (Theory) to be present in an amount substantially greater than the amount actually added. The water difference between Theory and Added to provide such unexpected amounts of sublimed fumaric acid may possibly have been generated by thermal decomposition of either the toluenesulfonic acid catalyst or maleic anhydride.

The data in Table III above indicates that the optimum fumaric acid sublimation suppression appears to be achieved at a weight rate of acetic anhydride (AC₂O) to toluenesulfonic acid between about 2.0–3.0:1.0.

In the reactions using acetic anhydride (Examples 14, 15, 16 and 18), the sublimed fumaric acid varied from about 18–20% in Examples 15 and 16 to 50–75% in Examples 18 and 14 of the total present (0.2 to 0.3% of reaction mixture).

In Examples 15 and 16 the sulfonic acid catalyst and acetic anhydride were added with molten maleic anhydried. In other Examples the sublimed fumaric acid varied from 50 to 95% of the total present. To further demonstrate this, reference is made to Example 15 of Table III wherein the amount of fumaric acid sublimed carburetor. Such alkenylsuccinimides prepared from alkenylsuccinic anhydride which was prepared in the presence of alkylbenzene sulfonic acid catalyst and acetic anhydride suppressor of fumaric acid sublimation, are superior with respect to haze and emulsion formed when water is present in the gasoline to the same alkenylsuccinimides prepared from alkenylsuccinic anhydride prepared in the absence of alkylbenzenesulfonic acid and acetic anhydride. To demonstrate said superiority, two gasoline samples are prepared each containing 20 weight parts per thousand barrels (PTB) of gasoline of each of the alkenylsuccinimide of diethylene triamine derived from alkenylsuccinic anhydride prepared according to this invention and from the alkenylsuccinic anhydride prepared in the absence of alkylbenzene sulfonic acid catalyst and acetic anhydride. Both alkenylsuccinnic anhydride products were prepared from 320 $\overline{M}_n$ polybutene. The one prepared according to this invention is from the method of Example 15 (Table III). Each gasoline containing said 320 $\overline{M}_n$ alkenylsuccinimide of diethylene triamine had a known weight percent water. Both gasolines were stirred and the haze developed was evaluated after 4 and 24 hours on a scale of 1 to 4 where 1 is clear solution and 4 is milky solution. The water-containing gasoline compositions are permitted to settle for 4 to 24 hours and the emulsified water was evaluated according to a scale of 1 to 4 where 1 is clear water-gasoline interface and 4 is inseparable emulsion. The results of these tests are shown in Table IV.

TABLE IV.—HAZE AND EMULSION TEST

Gasoline containing 20 PTB of 320 $\overline{M}_n$ alkenyl-substituted succinimide of diethylene triamine and water

| Alkenylsuccinimide from alkenyl succinic anhydride | Concentration, PTB | Haze rating [1] | | Emulsion rating [2] | |
|---|---|---|---|---|---|
| | | 4 hours | 24 hours | 4 hours | 24 hours |
| Non-catalytic preparation | 20 | 3 | 2 | 2 | 2 |
| Catalytic preparation | 20 | 2 | 2 | 1 | 1 |

[1] Mixed in Waring Blender for 30 seconds with 1.34% water.
[2] Mechanically shaken for 5 minutes with 11.94% water.

What is claimed is:

1. A method of inhibiting tarry-coke formation and fumaric acid sublimation during reaction of maleic anhydride with an alkene hydrocarbon for the preparation of alkenylsuccinic anhydride wherein the alkene hydrocarbon has a molecular weight in the range of 168 to 900 which method comprises reacting said alkene hydrocarbon and maleic anhydride in the respective molar ratio of 1.0–1.2:1.0 at a temperature above the melting point of maleic anhydride up to 232° C. and in the presence of an alkylbenzenesulfonic acid and acetic anhydride wherein the amount of alkylbenzene sulfonic acid is in the range of 0.2 to 1.0 weight percent of maleic anhydride and the amount of acetic anhydride is in the weight ratio based on the alkylbenzenesulfonic acid of 1.0–3.0:1.0.

2. The method of claim 1 wherein the amount of alkylbenzenesulfonic acid is 0.36 to 0.73 weight percent of maleic anhydride and the weight ratio of acetic anhydride to said sulfonic acid is 2.0:1.0.

3. The method of claim 2 wherein the alkylbenzenesulfonic acid is p-toluenesulfonic acid.

4. The method of claim 3 wherein the p-toluenesulfonic acid is the monohydrate thereof.

5. The method of claim 3 wherein the p-toluenesulfonic acid consists of a mixture of 80 weight percent p-toluenesulfonic acid and 20 weight percent o-sulfonic acid.

6. The method of claim 3 wherein the alkene hydrocarbon has a molecular weight of 320.

7. The method of claim 6 wherein the alkene hydrocarbon is polybutene having a number average molecular weight of 320.

8. The method of claim 3 wherein the alkene hydrocarbon is a polybutene of 900 number average molecular weight.

9. The method of claim 3 wherein the alkene hydrocarbon is a polypropene 575 number average molecular weight.

References Cited
UNITED STATES PATENTS 2,124,628  7/1933  Moser  87—9
2,133,734  10/1938  Moser  87—9

HENRY R. JILES, Primary Examiner

M. A. M. CROWDER, Assistant Examiner

U.S. Cl. X.R.
260—78.4 D, 537

UNITED STATES PATENT OFFICE
CERTIFICATE OF CORRECTION

Patent No. 3,819,660   Dated June 25, 1974

Inventor(s) Paul J. Cahill & Adam S. Kurasiewicz

It is certified that error appears in the above-identified patent and that said Letters Patent are hereby corrected as shown below:

Col. 1, Line 42   polypropane should be polypropene
Col. 3, Line 56   decending should be descending
Col. 4, Lines 47-52   should read:

... mer reactant occurs more uniquely during the addition reaction than in the absence of such reaction. Heating a mixture of the butene polymer and the alkylbenzenesulfonic acid catalyst causes some isomerization of the polymer but also adversely causes darkening of the resulting ...

Signed and sealed this 5th day of November 1974.

(SEAL)
Attest:

McCOY M. GIBSON JR.
Attesting Officer

C. MARSHALL DANN
Commissioner of Patents